United States Patent
Yip et al.

(10) Patent No.: US 10,827,160 B2
(45) Date of Patent: Nov. 3, 2020

(54) METHOD FOR TRANSMITTING DATA RELATING TO THREE-DIMENSIONAL IMAGE

(71) Applicant: Samsung Electronics Co., Ltd., Gyeonggi-do (KR)

(72) Inventors: Eric Yip, Seoul (KR); Byeong-Doo Choi, Gyeonggi-do (KR); Jae-Yeon Song, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/470,446

(22) PCT Filed: Nov. 14, 2017

(86) PCT No.: PCT/KR2017/012899
§ 371 (c)(1),
(2) Date: Jun. 17, 2019

(87) PCT Pub. No.: WO2018/110839
PCT Pub. Date: Jun. 21, 2018

(65) Prior Publication Data
US 2020/0120325 A1    Apr. 16, 2020

Related U.S. Application Data

(60) Provisional application No. 62/435,348, filed on Dec. 16, 2016.

(30) Foreign Application Priority Data

Nov. 14, 2017 (KR) ........................ 10-2017-0151519

(51) Int. Cl.
*H04N 13/178*   (2018.01)
*H04N 13/139*   (2018.01)
*H04N 13/194*   (2018.01)

(52) U.S. Cl.
CPC ......... *H04N 13/178* (2018.05); *H04N 13/139* (2018.05); *H04N 13/194* (2018.05)

(58) Field of Classification Search
CPC .. H04N 13/117; H04N 13/156; H04N 5/2226; H04N 5/2254; H04N 21/236;
(Continued)

(56) References Cited

U.S. PATENT DOCUMENTS 10,417,833 B2 * 9/2019 Eisenmann ............. G06T 19/20
10,419,737 B2 * 9/2019 Pang .................... H04N 5/2258
(Continued)

FOREIGN PATENT DOCUMENTS

KR    1998035726    8/1998
KR    1020120016896   2/2012
(Continued)

OTHER PUBLICATIONS

PCT/ISA/210 Search Report issued on PCT/KR2017/012899 pp. 5.
(Continued)

*Primary Examiner* — James M Pontius
(74) *Attorney, Agent, or Firm* — The Farrell Law Firm, P.C.

(57) ABSTRACT

Provided is a method for displaying a 3-dimensional (3D) image by a device. The method comprises the steps of: transmitting information on a viewport of the device to a server; receiving data about at least one second region corresponding to the viewport among a plurality of regions of a packed 2D image from the server; and displaying the 3D image based on the received data, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of (Continued)

regions of the 3D image and information on a relationship between an index of each of the plurality of regions of the 3D image and an index of each of the plurality of regions of the packed 2D image.

10 Claims, 13 Drawing Sheets

(58) Field of Classification Search
CPC .. H04N 21/434; H04N 13/218; H04N 13/178; H04N 13/139; H04N 13/194; H04N 13/172; H04N 13/30; H04N 21/816; H04N 13/00; H04N 21/81
USPC ........................ 348/36–61; 375/240.1–240.29
See application file for complete search history.

(56) References Cited

U.S. PATENT DOCUMENTS

| | | | | |
|---|---|---|---|---|
| 10,567,734 | B2* | 2/2020 | Stockhammer | H04N 21/2355 |
| 2014/0380191 | A1* | 12/2014 | Rotbaein | H04L 65/403 |
| | | | | 715/753 |
| 2016/0191798 | A1 | 6/2016 | Yoo et al. | |
| 2018/0091577 | A1 | 3/2018 | Park et al. | |
| 2019/0045222 | A1 | 2/2019 | Yip et al. | |
| 2019/0052858 | A1* | 2/2019 | Yip | H04N 5/23238 |
| 2019/0199995 | A1* | 6/2019 | Yip | H04N 13/161 |
| 2019/0379884 | A1* | 12/2019 | Oh | H04N 19/46 |
| 2020/0105047 | A1* | 4/2020 | Huang | G06F 3/011 |
| 2020/0112710 | A1* | 4/2020 | Oh | H04N 19/154 |
| 2020/0153885 | A1* | 5/2020 | Lee | H04N 13/194 |

FOREIGN PATENT DOCUMENTS

| | | |
|---|---|---|
| KR | 1020120093693 | 8/2012 |
| KR | 1020150102433 | 9/2015 |
| KR | 10-2016-0125708 | 11/2016 |
| KR | 10-2017-0095030 | 8/2017 |

OTHER PUBLICATIONS

PCT/ISA/237 Written Opinion issued on PCT/KR2017/012899, pp. 8.
LG Electronics, "Signaling of VR Video Information in ISOBMFF", ISO/IEC JTC1/SC29/WG11 MPEG2016/m38565, May-Jun. 2016, 7 pages.
European Search Report dated Nov. 4, 2019 issued in counterpart application No. 17880224.5-1209, 8 pages.

* cited by examiner

METHOD FOR TRANSMITTING DATA RELATING TO THREE-DIMENSIONAL IMAGE

PRIORITY

This application is a National Phase Entry of International Application No. PCT/KR2017/012899, which was filed on Nov. 14, 2017, and claims priority to U.S. Provisional Patent Application No. 62/435,348, filed on Dec. 16, 2016, and Korean Patent Application No. 10-2017-0151519, filed on Nov. 14, 2017, the content of each of which is incorporated herein by reference.

TECHNICAL FIELD

The present invention relates to a method and device for transmitting data related to three-dimensional (3D) images and, particularly, to a method and device for selectively transmitting data about a particular portion of a 3D image.

BACKGROUND ART

With virtual reality (VR) or augmented reality (AR) technology developing, techniques related to the processing and transmitting 3D images (or omnidirectional images) for display on VR or AR capable devices are advancing as well.

To provide an omnidirectional image to the VR device wearer, the size of the 3D image-related data containing the omnidirectional image-related data may be significantly large. Thus, transmission of the 3D image-related data may overload the transmission system due to its data size. In particular, the size of the 3D image-related data may pose a significant limit on real-time provision of 3D images.

DETAILED DESCRIPTION OF THE INVENTION

Technical Problem

What may be considered to reduce the amount of 3D image-related data transmitted is to transmit not the whole 3D image but only a partial region of the 3D image related to a region (i.e., viewport) being currently displayed or to be displayed on a VR device. However, since the transmission of 3D image-related data is performed based on a 2D image projected from the 3D image, identifying, on the 2D image, the region corresponding to the viewport identified on the 3D image and identifying the region of the 2D image to be transmitted may pose an additional load to the VR system.

An object of the present invention is to provide a method and device for efficiently transmitting or receiving 3D image-related data.

Another object of the present invention is to provide a method and device for easily identifying at least one region to be selectively transmitted on a 2D image projected from a 3D image.

Objects of the present invention are not limited to the foregoing, and other unmentioned objects would be apparent to one of ordinary skill in the art from the following description.

Technical Solution

To achieve the foregoing objects, according to an embodiment of the present invention, a method for displaying a three-dimensional (3D) image by a device comprises transmitting information on a viewport of the device to a server, receiving data about at least one second region corresponding to the viewport among a plurality of regions of a packed 2D image from the server, and displaying the 3D image based on the received data, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and information on a relationship between an index of each of the plurality of regions of the 3D image and an index of each of the plurality of regions of the packed 2D image.

According to another embodiment of the present invention, a device for displaying a 3D image comprises a communication interface and a processor coupled to the communication interface, wherein the processor is configured to transmit information on a viewport of the device to a server, receive data about at least one second region corresponding to the viewport among a plurality of regions of a packed 2D image from the server, and display the 3D image based on the received data, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and information on a relationship between an index of each of the plurality of regions of the 3D image and an index of each of the plurality of regions of the packed 2D image.

According to still another embodiment of the present invention, a method for transmitting data for a 3D image by a server comprises receiving information on a viewport of a device from the device, identifying at least one second region corresponding to the viewport among a plurality of regions of a packed 2D image, and transmitting data about the at least one second region to the device, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and information on a relationship between an index of each of the plurality of regions of the 3D image and an index of each of the plurality of regions of the packed 2D image According to yet still another embodiment of the present invention, a server for transmitting data for a three-dimensional (3D) image comprises a communication interface and a processor coupled to the communication interface, wherein the processor is configured to receive information on a viewport of a device from the device, identify at least one second region corresponding to the viewport among a plurality of regions of a packed 2D image, and transmit data about the at least one second region to the device, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and information on a relationship between an index of each of the plurality of regions of the 3D image and an index of each of the plurality of regions of the packed 2D image.

Details of other embodiments are set forth in the detailed description and the drawings.

Advantageous Effects

Embodiments of the present invention present the following effects, at least.

In other words, it is possible to efficiently provide 3D image-related data.

Further, it is possible to easily identify at least one region to be selectively transmitted on a 2D image based on projection from a 3D image.

The effects of the present invention are not limited thereto, and the present invention encompasses other various effects.

MODE FOR CARRYING OUT THE INVENTION

Advantages and features of the present invention, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present invention. The present invention is defined only by the appended claims.

Although the terms "first" and "second" are used to describe various components, the components are not limited by the terms. These terms are provided simply to distinguish one component from another. Accordingly, the first component mentioned herein may also be the second component within the technical spirit of the present invention.

Figure 1:
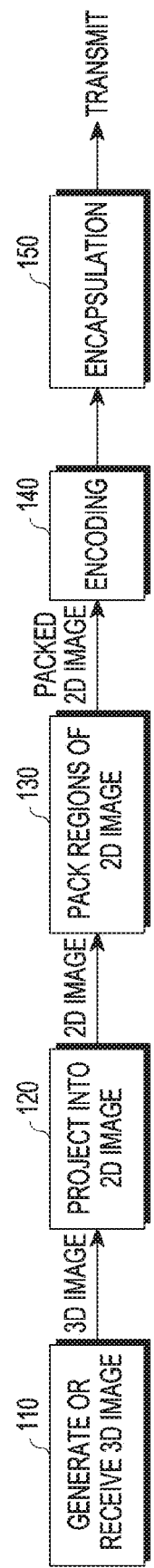
FIG. 1 illustrates a system of a transmitter for transmitting 3D image-related data according to an embodiment of the present invention.

FIG. 1 illustrates a system of a transmitter for transmitting 3D image-related data according to an embodiment of the present invention.

FIG. 1 illustrates a system of a transmitter according to an embodiment of the present invention. The transmitter may be a server to provide 3D image-related data or services. Here, 3D image may refer to both a dynamic image and a static image. The transmitter may generate or receive 3D images (110). The transmitter may generate a 3D image by stitching images captured by multiple cameras in various directions. The transmitter may externally receive data regarding a 3D image already produced. The 3D image may be rendered in any one shape of sphere, cube, cylinder, or octahedron. However, the enumerated shapes of the 3D image are merely examples and various shapes of the 3D image which are available in the relevant art may be generated or received.

The transmitter may project the 3D image into a 2D image (120). Any one of equirectangular projection (ERP), octahedron projection (OHP), cylinder projection, cube projection, and various projection schemes available in the relevant art may be used to project the 3D image into the 2D image.

The transmitter may pack the projected 2D image (130). Packing may mean producing a new 2D image (i.e., packed 2D image) by modifying and/or rearranging at least some of the plurality of regions constituting the projected 2D image. Here, modifying a region may mean, e.g., a resizing, transforming, rotating, and/or re-sampling (e.g., upsampling, downsampling, and differential sampling depending on positions in the region) of the region.

Figure 2:
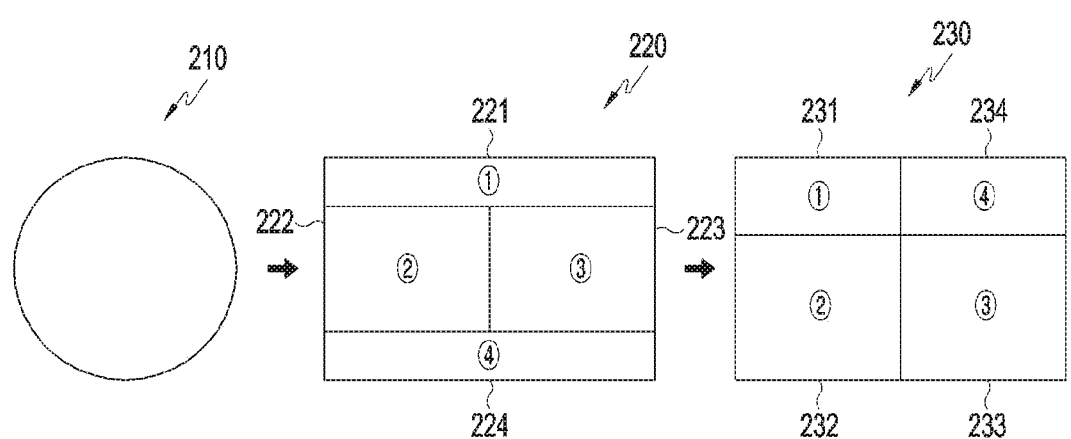
FIG. 2 illustrates projecting a 3D image into a 2D image and packing the projected 2D image according to an embodiment of the present invention.

Projection 120 and packing 130 are described below in greater detail with reference to FIG. 2. FIG. 2 illustrates projecting a 3D image into a 2D image and packing the projected 2D image according to an embodiment of the present invention. In FIG. 2, an example 3D image 210 may be spherical. A projected 2D image 220 may be generated by projecting a 3D image 210 in an example ERP scheme. The projected 2D image 220 may be split into a plurality of regions 221, 222, 223, and 224. There may be various methods of splitting the projected 2D image 220 according to embodiments.

A packed 2D image 230 may be generated from the projected 2D image 220. The packed 2D image 230 may be generated by modifying and/or rearranging the plurality of regions 221, 222, 223, and 224 of the projected 2D image 220. A plurality of regions 231, 232, 233, and 234 of the packed 2D image 230, respectively, may sequentially correspond to the plurality of regions 221, 222, 223, and 224 of the projected 2D image 220. The modification and rearrangement of the plurality of regions 231, 232, 233, and 234 of the packed 2D image 230 shown in FIG. 2 is merely an example and various types of modification and rearrangement may be performed according to embodiments.

Referring back to FIG. 1, the transmitter may encode the packed 2D image (240). The packed 2D image may be split into a plurality of regions. The plurality of regions of the packed 2D image may individually be encoded. In some embodiments, encoding may be performed only on one or more regions to be transmitted among the plurality of regions of the packed 2D image. In some embodiments, encoding may be performed on a group image for two or more among the plurality of regions of the packed 2D image. In some embodiments, the whole packed 2D image may be encoded. Encoding may be performed in a known, existing 2D image encoding scheme.

The transmitter may encapsulate the encoded data (150). Encapsulation may mean processing the encoded data to follow a predetermined transmission protocol by, e.g., splitting the encoded data and processing, e.g., adding heads to the splits. The transmitter may transmit the encapsulated data.

Figure 3:
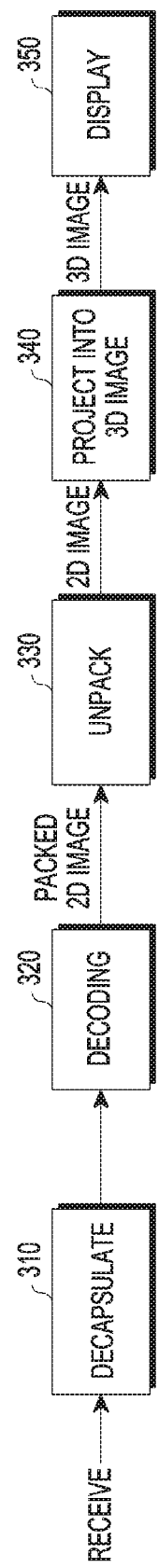
FIG. 3 illustrates a system of a receiver for receiving 3D image-related data according to an embodiment of the present invention.

A receiver is described below with reference to FIG. 3. FIG. 3 illustrates a system of a receiver for receiving 3D image-related data according to an embodiment of the present invention. The receiver may be a VR device or an AR device. The receiver may otherwise denote any kind of device capable of receiving and playing 3D image-related data.

The receiver may receive 3D image-related data from a transmitter. The receiver may decapsulate the received data (310). The encoded data generated by the encoding 140 of FIG. 1 may be obtained by decapsulation 310.

The receiver may decode the decapsulated (310) data (320). The packed 2D image may be restored by decoding (320).

The receiver may unpack the decoded data (i.e., packed 2D image) (330). The 2D image generated by projection 120 of FIG. 1 may be restored by unpacking. Unpacking may be reverse conversion of the modification and/or rearrangement of the plurality of regions of the projected 2D image performed on packing 130 of FIG. 1. To that end, the receiver needs to be aware of the method of packing 130. The method of packing 130 may be predetermined between the receiver and the transmitter. In some embodiments, the transmitter may transfer information regarding the method of packing 130 to the receiver through a separate message, such as metadata. In some embodiments, the transmission data generated via encapsulation 150 may contain information regarding the method of packing 130 in, e.g., the header.

The receiver may project the unpacked 2D image into a 3D image (340). To project the 2D image into the 3D image, the receiver may use reverse projection of the projection used to project (120) the 2D image as shown in FIG. 1, but is not necessarily limited thereto. The receiver may project the unpacked 2D image into the 3D image, generating a 3D image.

The receiver may display at least part of the 3D image via a display device (350). For example, the receiver may extract only data corresponding to the current field-of-view (FOV) of the 3D image and render the data.

In some embodiments, only data about part of the 3D image among 3D image-related data may be transmitted to reduce the 3D image-related data transmission load. For example, the transmitter may split the packed 2D image into a plurality of regions and transmit only one or more, containing data of the viewport of the receiver, among the plurality of regions of the packed 2D image. Here, the plurality of regions of the 2D image split for transmission may be set regardless of the plurality of regions of the projected 2D image split for packing. In this case, identifying the region corresponding to the viewport on the 3D image among the plurality of regions of the packed 2D image split for transmission may increase the load to computation by the processor of the receiver. Thus, such a method is required as to identify the region on the 3D image, corresponding to the viewport, in a simplified manner. A method of identifying a region on a 3D image corresponding to a viewport is described below with reference to FIGS. 4 to 6, according to an embodiment of the present invention.

Figure 4:
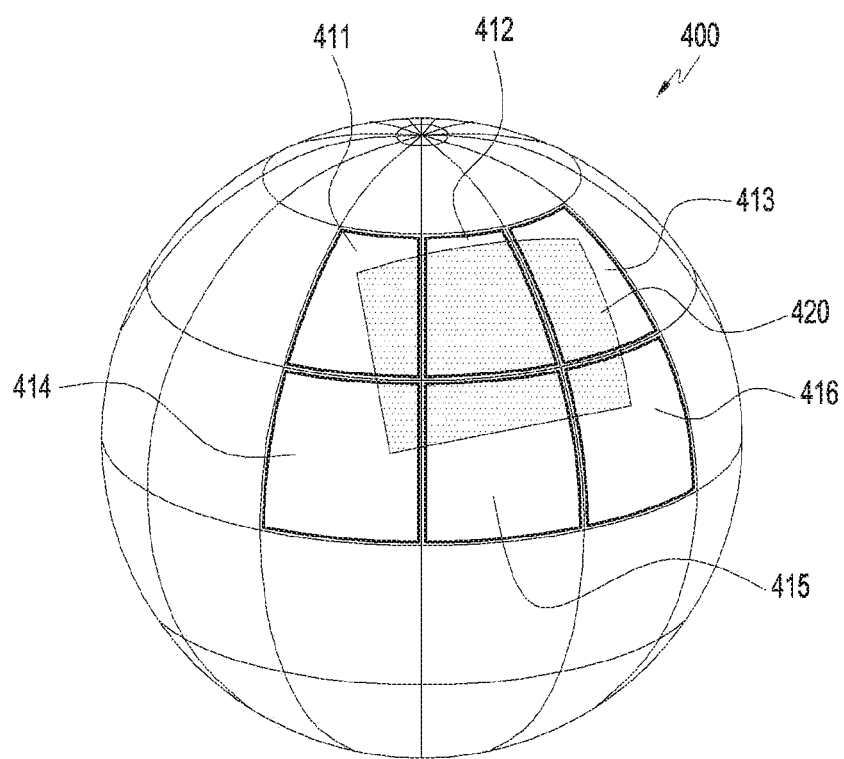
FIG. 4 illustrates a viewport on a 3D image split into a plurality of regions according to an embodiment of the present invention.

FIG. 4 illustrates a viewport on a 3D image split into a plurality of regions according to an embodiment of the present invention. An example 3D image 400 may be rendered in a spherical shape. The 3D image 400 may be split into a plurality of regions. The plurality of regions of the 3D image 400 each may be split to have a predetermined latitude angle range and a predetermined longitude angle range, but is necessarily not limited thereto. In the example of FIG. 4, each of the plurality of regions of the 3D image 400 has been set to have a 45-degree longitude angle range and a 30-degree latitude angle range. An index may be set to each of the plurality of regions of the 3D image 400. The index for each of the plurality of regions may be represented in such a form as [x, y] where x and y are the row and column, respectively, of the region in a matrix formed by the regions, but is not necessarily limited thereto. The viewport 420 may be positioned in a first region to a sixth region 411, 412, 413, 414, 415, and 416 among the plurality of regions of the 3D image 400. The indexes of the first to sixth regions of the 3D image 400 may be [0, 1], [1, 1], [2, 1], [0, 2], [1, 2], and [2, 2], respectively.

Figure 5:
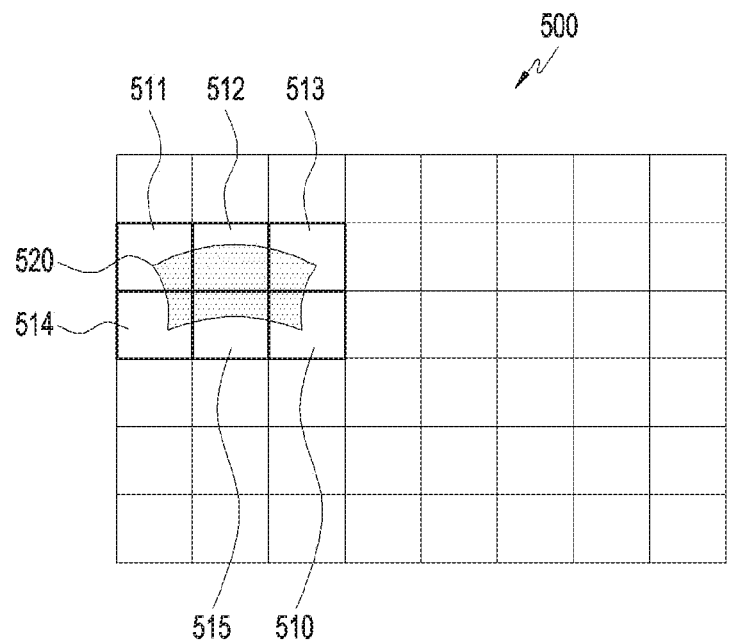
FIG. 5 illustrates a 2D image projected from the 3D image of FIG. 4 in an equirectangular projection (ERP) scheme.

FIG. 5 illustrates a 2D image projected from the 3D image of FIG. 4 in an ERP scheme. A projected 2D image 500 may be split into a plurality of regions corresponding to a plurality of regions of a 3D image 400. In a case where the plurality of regions of the 3D image 400 have the same latitude angle range and the same longitude angle range as described in connection with FIG. 4, the plurality of regions of the 2D image 500 projected in the ERP scheme corresponding to the plurality of regions of the 3D image 400 may be rectangular in the same size. Regions 511, 512, 513, 514, 515, and 516 among the plurality of regions including the region 517 corresponding to the viewport on the projected 2D image 500 may correspond to a first region to a sixth region 411, 412, 413, 414, 415, and 416 of the 3D image 400.

Figure 6:
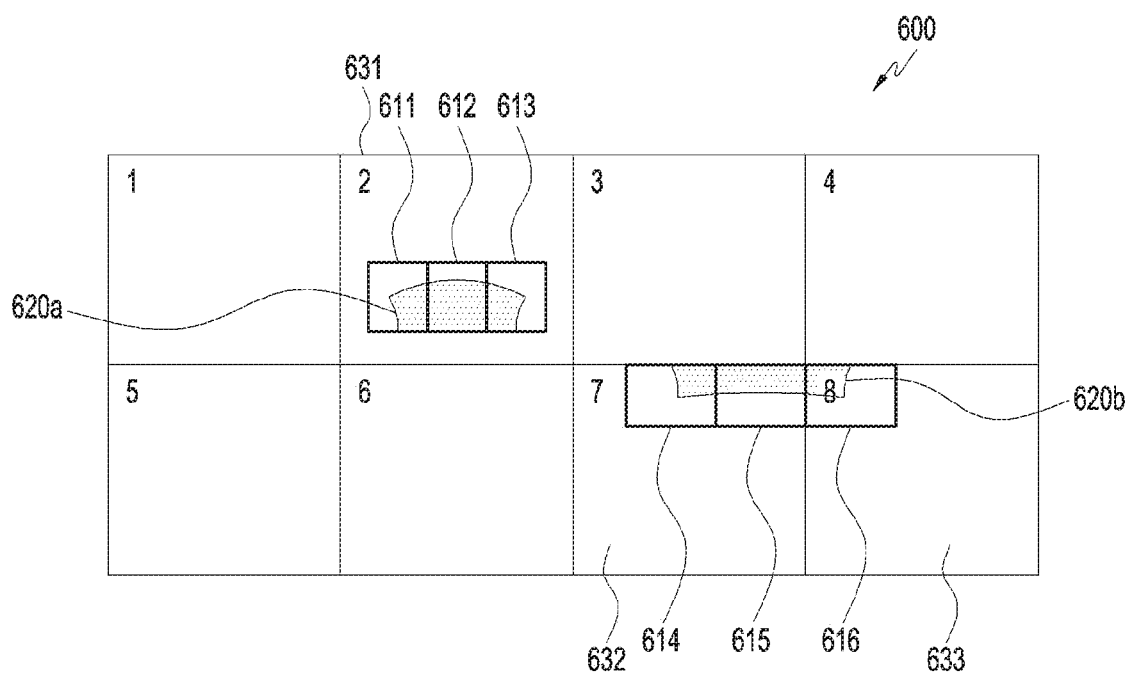
FIG. 6 illustrates a 2D image packed from the ERP 2D image of FIG. 5.

FIG. 6 illustrates a 2D image packed from the ERP 2D image of FIG. 5. A packed 2D image 600 may be generated from a projected 2D image 500 in any packing scheme. The regions, split for packing, of the projected 2D image 500 need not be the same as the plurality of regions of the projected 2D image 500 shown in FIG. 5. The packed 2D image 600 may be split into a plurality of regions for transmission purposes, and FIG. 6 illustrates an example in which the packed 2D image 600 is split into eight regions. An index may be assigned to each of the regions of the packed 2D image 600. In the example of FIG. 6, the regions are indexed as 1 to 8. Regions 611, 612, 613, 614, 615, and 616 in the packed 2D image 600 corresponding to regions 411, 412, 413, 414, 415, and 416 (i.e., corresponding to regions 511, 512, 513, 514, 515, and 516 of the projected 2D image 500) including the viewport 420 of the 3D image 400 may be included in regions 631, 632, and 633 indexed as 2, 7, and 8 among the regions split for transmission purposes. Regions 620*a* and 620*b* in the packed 2D image 600 corresponding to the viewport 420 may also be included in the regions 631, 632, and 633 indexed as 2, 7, and 8 among the regions split for transmission purposes. Thus, the transmitter may transmit data necessary for the receiver to display the viewport 420 by transmitting data about the regions 631, 632, and 633 indexed as 2, 7, and 8 among the plurality of regions of the packed 2D image 600. The transmitter or receiver may be aware of the relationship between the plurality of regions of the 3D image 400 and the plurality of regions of the packed 2D image 600. Thus, the transmitter or receiver may identify, from the respective indexes of the plurality of regions of the 3D image 400, regions of the plurality of regions of the packed 2D image 600 corresponding thereto without complicated computation. For example, a lookup table (LUT) as shown in Table 1 may be used to identify regions of the packed 2D image 600 which correspond to regions of the 3D image 400.

TABLE 1

| Indexes of regions of packed 2D image 600 | Indexes of regions of 3D image |
|---|---|
| 1 | [4, 0] [5, 0] [6, 0] [7, 0], [4, 1] [5, 1] [6, 1] [7, 1] |
| 2 | [0, 0] [1, 0] [2, 0] [3, 0], [0, 1] [1, 1] [2, 1] [3, 1] |
| 3 | [4, 4] [5, 4] [6, 4] [7, 4], [4, 5] [5, 5] [6, 5] [7, 5] |
| 4 | [0, 4] [1, 4] [2, 4] [3, 4], [0, 5] [1, 5] [2, 5] [3, 5] |
| 5 | [4, 2] [5, 2] [4, 3] [5, 3] |
| 6 | [6, 2] [7, 2] [6, 3] [7, 3] |
| 7 | [0, 2] [1, 2] [0, 3] [1, 3] |
| 8 | [2, 2] [3, 2] [2, 3] [3, 3] |

Such an LUT enables easier identification of regions 631, 632, and 633 on the packed 2D image 600, which have been indexed as 2, 7, and 8, corresponding to regions 411, 412, 413, 414, 415, and 416 on the 3D image 400, which have been indexed as [0, 1], [1, 1], [2, 1], [0, 2], [1, 2], and [2, 2].

As such, identifying regions on a packed 2D image corresponding to regions on a 3D image using indexes may apply not only where the 3D image is projected to the 2D image in an ERP scheme but also where such projection is performed in other schemes. An embodiment of projecting a 3D image into a 2D image using an octahedron projection (OHP) scheme is described below in connection with FIGS. 7 and 8.

Figure 7:
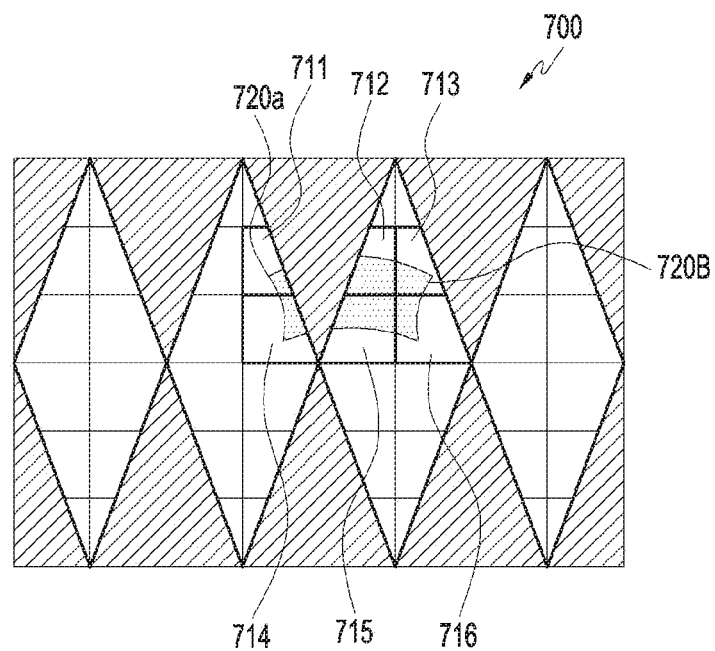
FIG. 7 illustrates an octahedron projection (OHP) 2D image from the 3D image of FIG. 4.

FIG. 7 illustrates an OHP 2D image from the 3D image of FIG. 4. Regions 711, 712, 713, 714, 715, and 716 in a 2D image 700 OHP projected may correspond to regions 411, 412, 413, 414, 415, and 416 including a viewport 420 of a 3D image 400. Regions 720*a* and 720*b* corresponding to the viewport 420 in the OHP-projected 2D image 700 may be included in the regions 711, 712, 713, 714, 715, and 716 in the OHP-projected 2D image 700.

Figure 8:
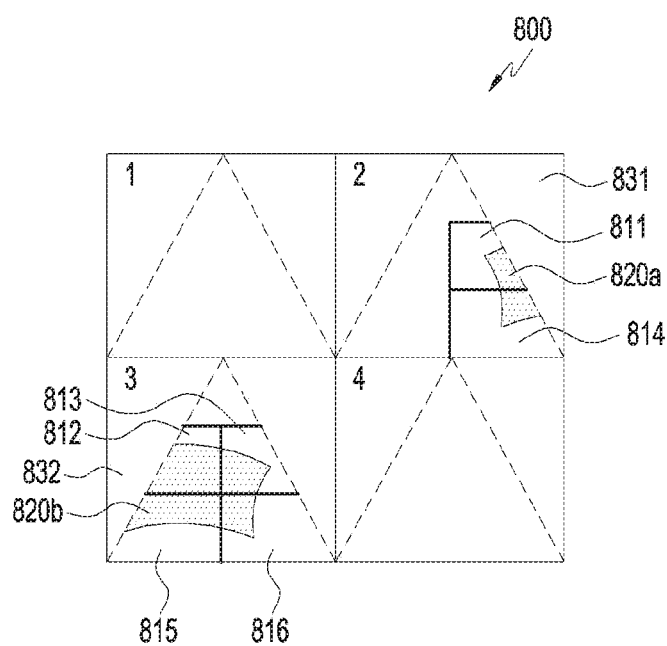
FIG. 8 illustrates a 2D image packed from the OHP projected 2D image of FIG. 7.

FIG. 8 illustrates a 2D image packed from the OHP projected 2D image of FIG. 7. A packed 2D image 800 may be generated from the projected 2D image 700 of FIG. 7 in any packing scheme. The packed 2D image 800 may be split into a plurality of regions, e.g., four regions indexed as 1 to 4, for transmission purposes. The regions 711, 712, 713, 714, 715, and 716 of the projected 2D image 700 of FIG. 7 may be included in the region 831 indexed as 2 and the region 832 indexed as 3 among the regions of the packed 2D image 800. The region corresponding to the viewport 420 may be disposed in the region 831 indexed as 2 and the region 832 indexed as 3 among the regions of the packed 2D image 800. Accordingly, the transmitter may transmit data about the region 831 indexed as 2 and the region 832 indexed as 3 among the regions of the packed 2D image 800 to transmit data regarding the viewport 420. Similar to FIGS. 5 and 6, the transmitter or receiver may be aware of the relationship between the plurality of regions of the 3D image 400 and the regions of the packed 2D image 800 and may accordingly identify, from the index of the region of the 3D image 400, the corresponding region of the packed 2D image 800. An LUT similar to Table 1 may be used to easily identify the relationship between the plurality of regions of the 3D image 400 and the regions of the packed 2D image 800.

In some embodiments, the receiver needs to be aware of the scheme in which the 3D image is split into the plurality of regions. The transmitter may provide a prior notification as to a method of splitting the 3D image into the plurality of regions. In some embodiments, information about the method of splitting 3D image into the plurality of regions may be transmitted as metadata. The transmitter may transmit the method of splitting the 3D image into the plurality of regions through example syntax as shown in Table 2 below.

TABLE 2

```
aligned(8) class SphericalTileCoordinatesSample( ){
    unsigned in(16) spherical_tile_groups;
        for(i=1; i<= spherical_tile_groups; i++) {
            unsigned int(16) spherical_tile_group_id
            unsigned int(16) hor_active_range_start;
            unsigned int(16) hor_active_range_end;
            unsigned int(16) vert_active_range_start;
            unsigned int(16) vert_active_range_end;
            unsigned int(1) spherical_tiles_enabled_flag;
            if( spherical_tiles_enabled_flag ) {
                unsigned int(16) num_spherical_tile_columns;
                unsigned int(16) num_spherical_tile_rows;
                unsigned int(1) uniform_spacing_flag;
                if( !uniform_spacing_flag ){
                    for(i=1; i<= num_spherical_tile_columns; i++) {
                        unsigned int(16) column_width_angle;
                    } for(i=1; i<= num_spherical_tile_rows; i++) {
                        unsigned int(16) row_height_angle;
                    }
                }
            }
        }
}
```

Figure 9:
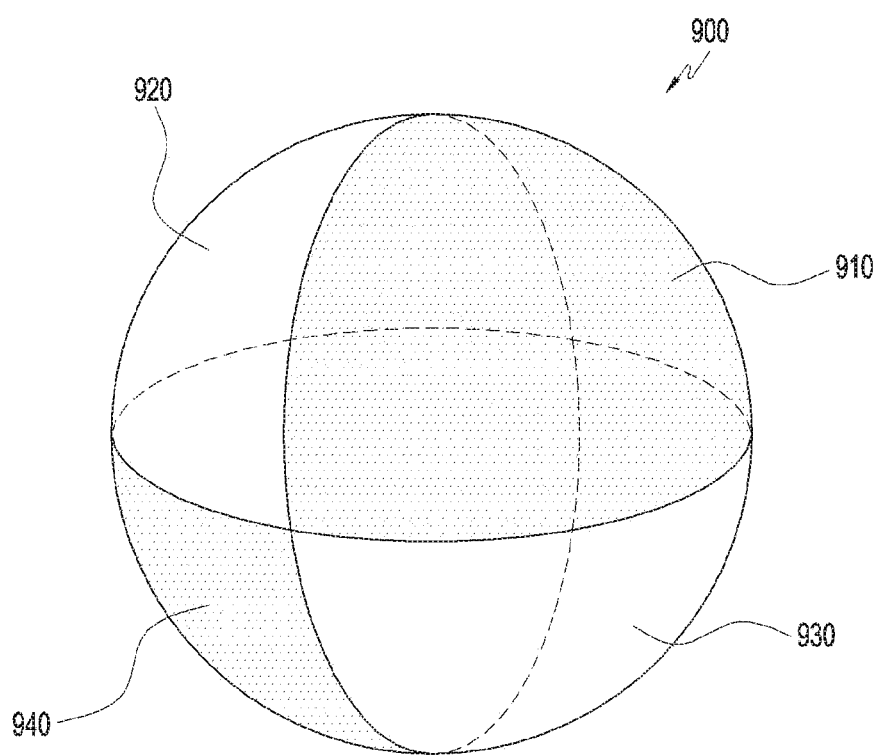
FIG. 9 illustrates groups of a plurality of regions of a 3D image according to an embodiment of the present invention.

The semantics for the syntax of Table 2 is as follows.

spherical_tile_groups—a parameter to define the number of groups of spherical tiles (i.e., a plurality of regions of a 3D image) including video data where the surface of a sphere (i.e., a spherical 3D image) is split spherical_tile_group_id—a parameter to define the identifier (ID) of a group of spherical tiles including video data where the surface of a sphere is split hor_active_range_start/end—a parameter to indicate a horizontal range of a group of spherical tiles given by a start angle and an end angle in a direction defined by θ (i.e., longitude)

vert_active_range_start/end—a parameter to indicate a vertical range of a group of spherical tiles given by a start angle and an end angle in a direction defined by φ (i.e., latitude)

spherical_tiles_enabled_flag—a flag to indicate whether a view direction is additionally split in an arrangement of the spherical tiles num_spherical_tile_columns—a parameter to specify the number of spherical tile columns in the group of spherical tiles num_spherical_tile_rows—a parameter to specify the number of spherical tile rows in the group of spherical tiles uniform_spacing_flag—a flag to indicate that the spherical tile row borders and spherical tile row borders are evenly distributed over the picture when it is 1 and that the spherical tile borders are defined by column_width_angle and row_height_angle when it is 0 column_width_angle[i]—a parameter to specify the width of the i-th spherical tile column in the group of spherical tiles in the direction defined by θ (i.e., longitude) at degrees row_height_angle[i]—a parameter to specify the height (width) of the i-th spherical tile row in the group of spherical tiles in the direction defined by φ (i.e., latitude) at degrees The syntax of Table 2 is an example when the 3D image is spherical. Further, the syntax of Table 2 exemplifies that the regions of the 3D image are grouped and notified. Referring to FIG. 9, grouping regions of a 3D image is described. FIG. 9 illustrates groups of a plurality of regions of a 3D image according to an embodiment of the present invention. Referring to FIG. 9, a plurality of regions on a 3D image 900 may be divided into four groups 910, 920, 930, and 940. The region corresponding to each of the groups 910, 920, 930, and 940 of the 3D image 900 may be set to have a longitude angle range of 180 degrees and a latitude angle range of 90 degrees. The 3D image 400 may be split into a plurality of regions in a scheme similar to that for the 3D image 400 of FIG. 4. Each of the groups 910, 920, 930, and 940 of the 3D image 900 may include 12 regions.

In some embodiments, a method of splitting the 3D image into a plurality of regions may be representing a set of the respective information pieces of the plurality of regions rather than grouping the plurality of regions.

Figure 10:
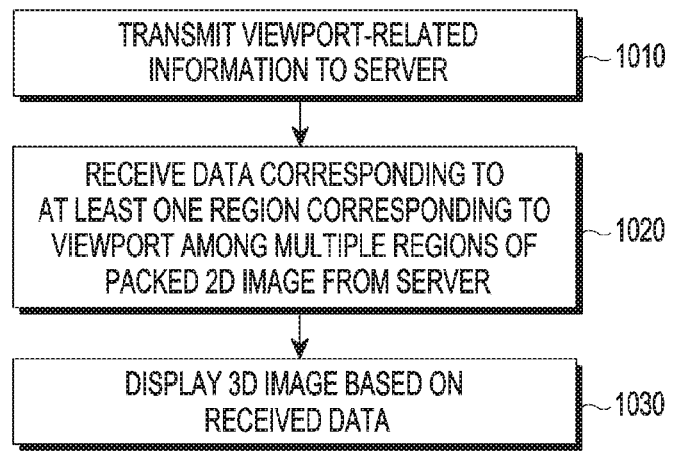
FIG. 10 is a flowchart illustrating operations of a receiver according to an embodiment of the present invention.

FIG. 10 is a flowchart illustrating operations of a receiver according to an embodiment of the present invention. Referring to FIG. 10, the receiver may transmit information about a viewport to a server (1010). The viewport-related information may be information directly indicating the placement of the viewport on the 3D image, information including the index of each of at least one region including the viewport among the plurality of regions of the 3D image, or information including the index of each of at least one region of the packed 2D image corresponding to at least one region including the viewport among the plurality of regions of the packed 2D image.

The receiver may receive, from the server, data corresponding to at least one region corresponding to the viewport among the plurality of regions of the packed 2D image (1020).

The receiver may display the 3D image based on the received data (1030). The receiver may only display the region corresponding to the viewport of the 3D image.

Operations of the receiver and transmitter are described below with reference to FIGS. 11 to 13, according to various embodiments.

Figure 11:
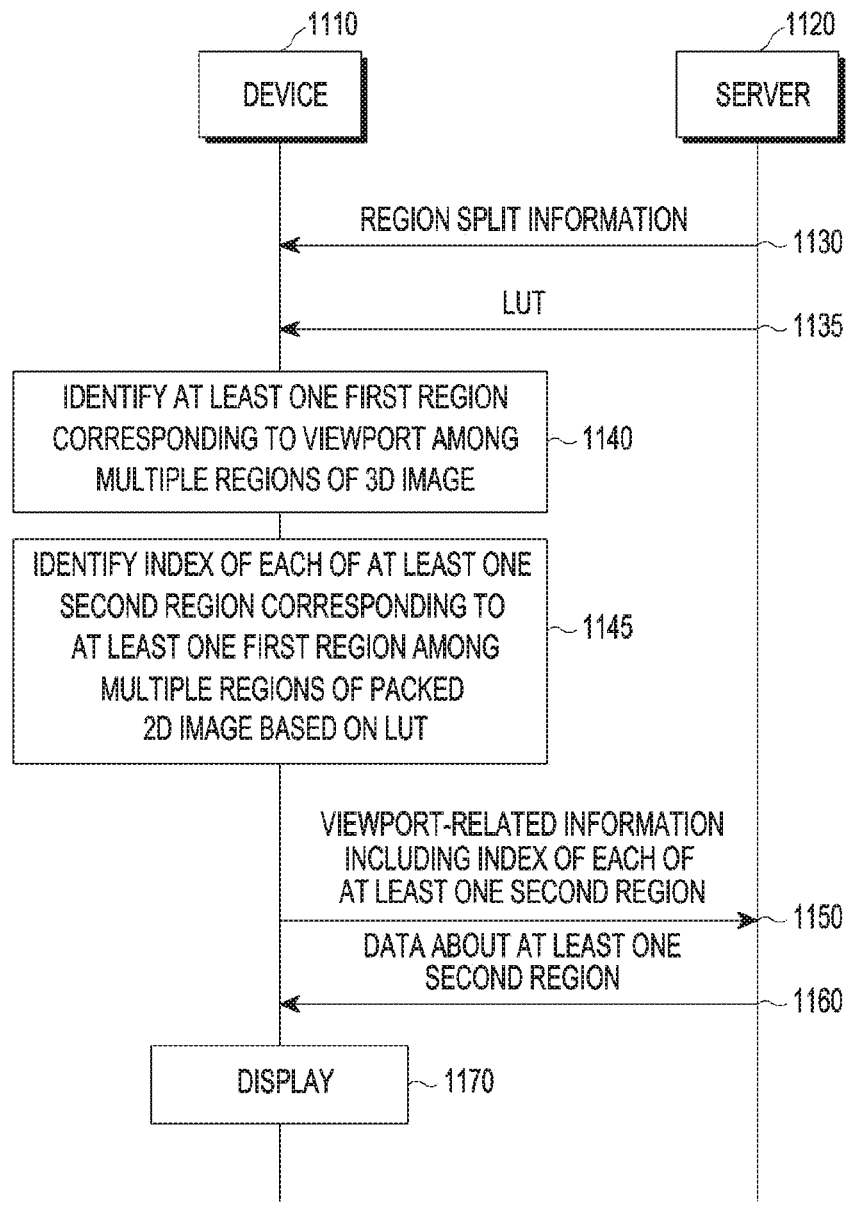
FIG. 11 is a flowchart illustrating operations of a device and a server according to another embodiment of the present invention.

FIG. 11 is a flowchart illustrating operations of a device and a server according to another embodiment of the present invention. A device 1110 and a server 1120 may correspond to the above-mentioned receiver and transmitter, respectively. In the embodiment of FIG. 11, the device 1110 may be aware of information about the relationship between the indexes of the plurality of regions of the 3D image and the indexes of the plurality of regions of the packed 2D image.

The server 1120 may transmit region split information to the device 1110 (1130). The region split information may include information about the indexes for the plurality of regions and the method of splitting the 3D image into the plurality of regions. The region split information may be transmitted in the form of syntax as in Table 2.

The server 1120 may transmit, to the device 1110, an LUT including the information about the relationship between the indexes of the plurality of regions of the 3D image and the indexes of the plurality of regions of the packed 2D image (1140). In some embodiments, the information about the relationship between the indexes of the plurality of regions of the 3D image and the indexes of the plurality of regions of the packed 2D image may be transmitted in a form other than an LUT. In some embodiments, the device 1110 may receive an LUT from a sever other than the server 1120 or another device. The LUT-related information may be transferred as metadata. The LUT-related information may be expressed as example syntax shown in Table 3.

TABLE 3

```
unsigned int(16) num_hevc_tiles;
    for(i=1; i<= num_hevc_tiles; i++) {
        unsigned int(16) hevc_tile_column_index;
        unsigned int(16) hevc_tile_row_index;
        unsigned int(16) num_spherical_tiles;
        for(i=1; i<=num_spherical_tiles; i++) {
            unsigned int(16) spherical_tile_column_index;
            unsigned int(16) spherical_tile_row_index;
        }
    }
```

The semantics for the parameters of the syntax of Table 3 is as follows.

num_hevc_tiles—a parameter to indicate the number of high efficiency video coding (HEVC) tiles (i.e., a plurality of regions of the projected 2D image) where the picture is encoded hevc_tile_column_index—a parameter to indicate the index of a particular HEVC tile column hevc_tile_row_index—a parameter to indicate the index of a particular HEVC tile row num_spehrical_tiles—a parameter to specify the number of spherical tiles contributing to video data in the HEVC tile (i.e., a parameter to specify the number of spherical tiles associated with a particular HEVC tile)

spherical_tile_column_index—a parameter to indicate the index of a particular spherical tile column associated with the HEVC tile spherical_tile_row_index—a parameter to indicate the index of a particular spherical tile row associated with the HEVC tile The device 1110 may identify at least one first region corresponding to the viewport among the plurality of regions of the 3D image (1140). In the example of FIG. 4, regions 411, 412, 413, 414, 415, and 416 may be identified as the at least one first region.

The device 1110 may identify the index of each of at least one second region corresponding to at least one first region among the plurality of regions of the packed 2D image based on the LUT (1145). In the example of FIG. 6, indexes 2, 7, and 8 may be identified as the respective indexes of at least one second region.

The device 1110 may transmit information regarding the viewport including the respective indexes of at least one second region to the server 1120.

The server 1120 may identify at least one second region based on the respective indexes of the at least one second region. Accordingly, the server 1120 may transmit data about the at least one second region to the device 1110.

The device 1110 may display at least part (e.g., viewport) of the 3D image based on the received data about at least one second region.

Figure 12:
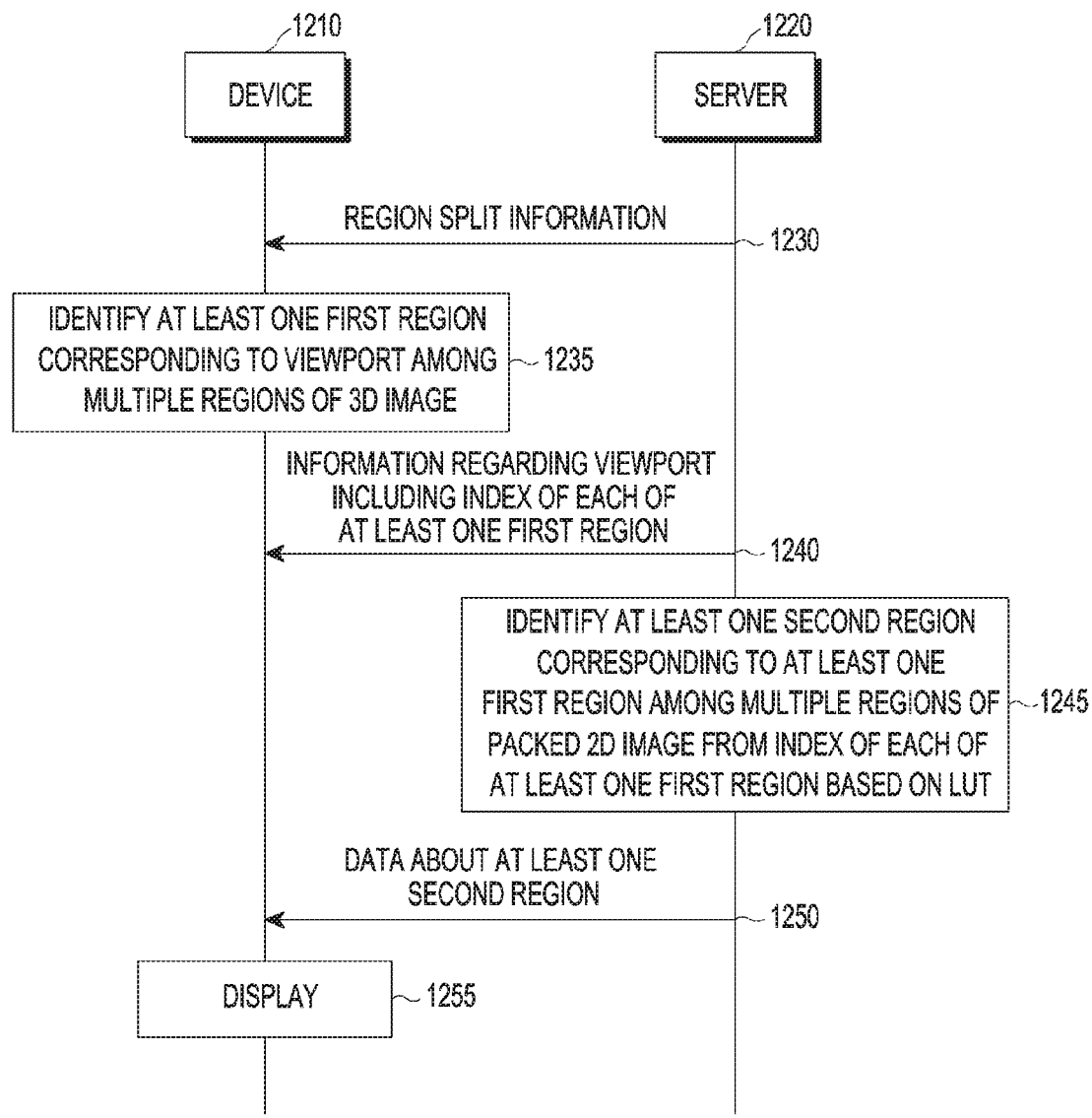
FIG. 12 is a flowchart illustrating operations of a device and a server according to still another embodiment of the present invention.

FIG. 12 is a flowchart illustrating operations of a device and a server according to still another embodiment of the present invention. In the embodiment of FIG. 12, a device 1210 may be aware of the method of splitting the 3D image into the plurality of regions and information about the indexes about the plurality of regions.

The server 1220 may transmit region split information 1230 to the device 1210. The region split information may include information about the indexes for the plurality of regions and the method of splitting the 3D image into the plurality of regions. The region split information may be transmitted in the form of syntax as in Table 2.

The device 1210 may identify at least one first region corresponding to the viewport among the plurality of regions of the 3D image (1235).

The device 1210 may transmit information regarding the viewport including the respective indexes of at least one first region to the server 1220. The respective indexes of the at least one first region may be identified based on the region split information.

The server 1220 may identify at least one second region corresponding to the at least one first region among the plurality of regions of the packed 2D image from the respective indexes of the at least one first region based on an LUT (1245). Here, the LUT may be a form of information indicating the relationship between the indexes of the plurality of regions of the 3D image and the indexes of the packed 2D image and, in some embodiments, such information might not have the LUT form.

The server 1220 may transmit the identified data about the at least one second region to the device 1210 (1250).

The device 1210 may display the 3D image based on the received data (1255).

Figure 13:
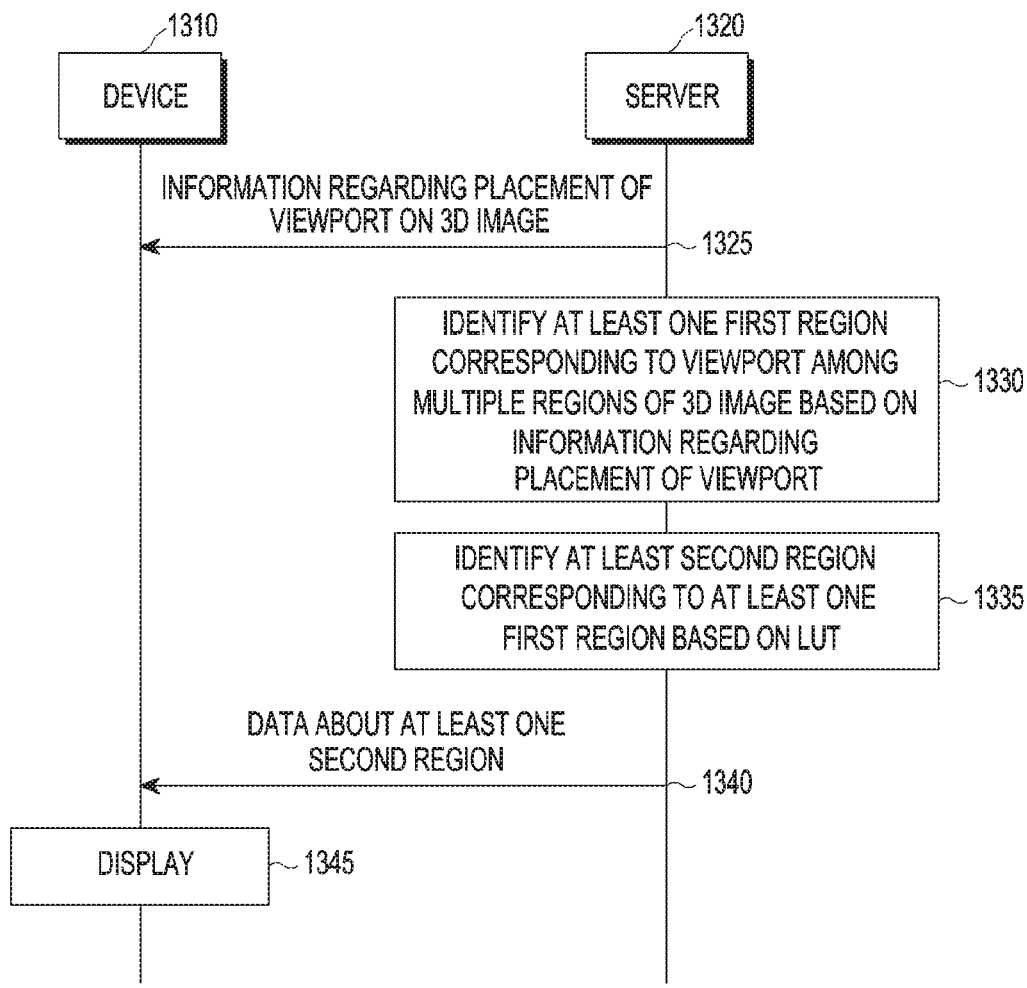
FIG. 13 is a flowchart illustrating operations of a device and a server according to still another embodiment of the present invention.

FIG. 13 is a flowchart illustrating operations of a device and a server according to still another embodiment of the present invention. In the embodiment of FIG. 13, the device 1310 might not obtain region split information and LUT-related information.

Figure 14:
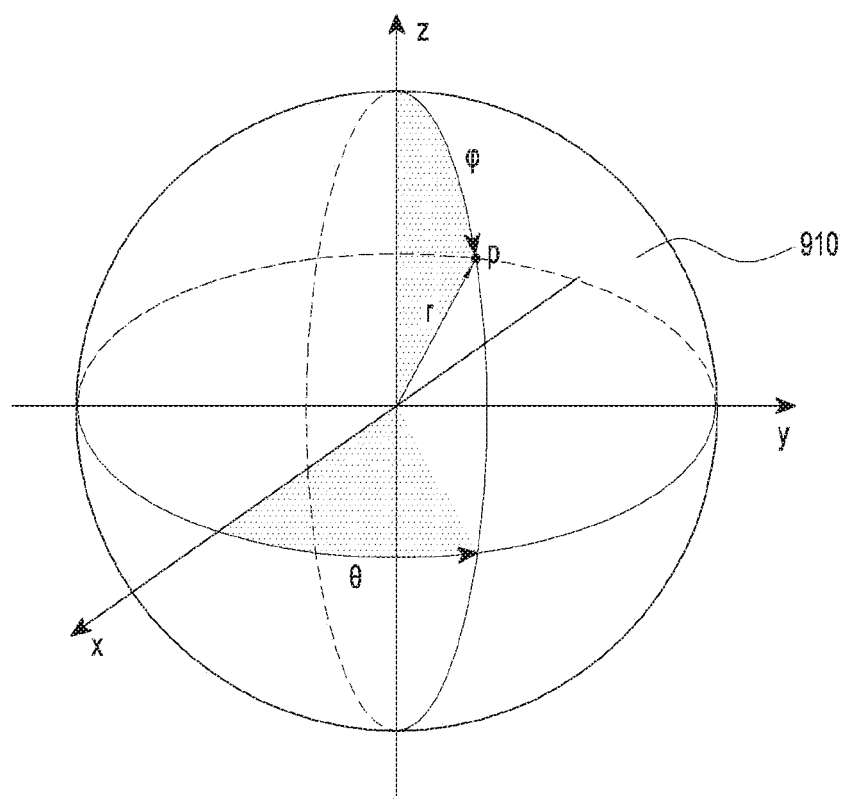
FIG. 14 illustrates an example method of representing the coordinates of a particular point on a spherical 3D image.

The device 1310 may transmit information regarding the placement of viewport on the 3D image to the server 1320. The information regarding the placement of viewport may directly indicate the position and area where the viewport is disposed on the 3D image. For example, in a case where the 3D image is shaped as a sphere, the information regarding the placement of viewport may be expressed using the coordinates on surface of the sphere. Referring to FIG. 14, which exemplifies a method of representing the coordinates of a particular point on the spherical 3D image, the position of the point P on the spherical surface in the 3D coordinate system may be expressed with the radius r, latitude $\theta$, and longitude $\varphi$ of the sphere. Since the radius r of the spherical 3D image is already known between the server 1320 and the device 1310, the device 1310 may notify the server of the particular point on the 3D image through the latitude $\theta$ and longitude $\varphi$. The device 1310 may use various methods for expressing the placement of viewport. In some embodiments, the device 1310 may express the placement of viewport via the coordinates of the edges of the viewport. In some embodiment, the device 1310 may express the placement of the viewport using the coordinates of the edges of the viewport and the coordinates of points on the border of the viewport between the edges of the viewport. In some embodiments, the device 1310 may express the placement of the viewport using the value indicating the rotation of the viewport based on the center of the viewport and the coordinates of the center of the viewport and values indicating the angle ranges (e.g., the vertical angle range and horizontal angle range based on the value indicating the rotation of the viewport) of the viewport from the center of the sphere. The above-described methods for expressing the placement of viewport are merely an example, and the device 1310 may express the placement of viewport on the 3D image using various methods.

Referring back to FIG. 13, the server 1320 may identify at least one first region corresponding to the viewport among the plurality of regions of the 3D image based on the information regarding the placement of the viewport (1330). The server may use the region split information described above in connection with FIGS. 11 and 12 to identify at least one first region.

The server 1320 may identify at least one second region corresponding to at least one first region based on an LUT (1335). In other words, the server 1320 may identify at least one second region by obtaining, from the LUT, the identifier of each of at least one second region corresponding to the identifier of each of at least one first region.

The server 1320 may transmit the identified data about the at least one second region to the device 1310 (1340).

The device 1310 may display the 3D image based on the received data (1345).

Figure 15:
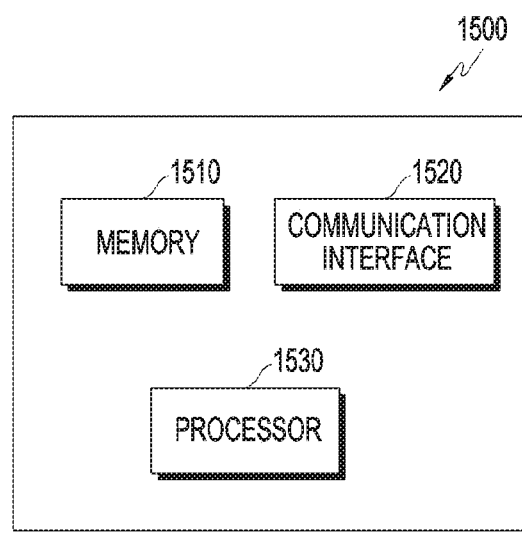
FIG. 15 is a block diagram illustrating a receiver according to an embodiment of the present invention.

The structure of a receiver is described below with reference to FIG. 15. FIG. 15 is a block diagram illustrating a receiver according to an embodiment of the present invention. A receiver 1500 may include a memory, a communication interface 1520, and a processor 1530. The receiver 1500 may be configured to perform the operations of the receiver (i.e., the device) described above in connection with embodiments. The processor 1530 may communicably and electrically connect with the memory 1510 and the communication interface 1520. The receiver 1500 may transmit and receive data through the communication interface 1520. The memory 1510 may store pieces of information for operations of the receiver 1500. The memory 1510 may store commands or codes for controlling the processor 1530. Additionally, the memory 1510 may store transitory or non-transitory data necessary for the operation of the processor 1530. The processor 1530 may be one processor and, in some embodiments, the processor 1530 may mean a set of a plurality of processors differentiated depending on functions. The processor 1530 may be configured to control the operation of the receiver 1500. The above-described operations of the receiver 1500 may be processed and executed substantially by the processor 3530. Although transmission or reception of signals is performed through the communication interface 1520, and storage of data and commands is carried out by the memory 1510, the operations of the communication interface 1520 and the memory 1510 may be controlled by the processor 1530, and thus, the transmission and reception of signals and storage of data and commands may also be deemed to be performed by the processor 1530. Although not shown, the receiver 1530 may further include a display device for displaying 3D images.

Similar to the receiver 1530, the transmitter may include a memory, a communication interface, and a processor. The description of the memory, communication interface, and processor of the transmitter is similar to the description of the corresponding elements of the receiver 1530.

Although embodiments of the present invention have been described with reference to the accompanying drawings, it will be appreciated by one of ordinary skill in the art that the present invention may be implemented in other various specific forms without changing the essence or technical spirit of the present invention. Thus, it should be noted that the above-described embodiments are provided as examples and should not be interpreted as final limits.

The invention claimed is:

1. A method for displaying a three-dimensional (3D) image by a device, the method comprising:
    receiving information on a relationship between indices of a plurality of regions of the 3D image and indices of a plurality of regions of a packed two-dimensional (2D) image, from a server;

transmitting information on a viewport of the device to the server, wherein the information on the viewport includes an index of each of at least one second region corresponding to the viewport among the plurality of regions of the packed 2D image;

in response to transmitting the information on the viewport, receiving data about the at least one second region; and displaying the 3D image based on the received data, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and the information on the relationship between the indices of the plurality of regions of the 3D image the indices of the plurality of regions of the packed 2D image.

2. The method of claim 1, wherein the information on the relationship between the indices of the plurality of regions of the 3D image and the indices of the plurality of regions of the packed 2D image has a form of a lookup table (LUT).

3. The method of claim 2, further comprising:

identifying the at least one first region among the plurality of regions of the 3D image; and identifying the index of each of the at least one second region corresponding to the index of each of the at least one first region based on the LUT.

4. A device for displaying a three-dimensional (3D) image, comprising:

a communication interface; and a processor coupled to the communication interface, wherein the processor is configured to:

receive information on a relationship between indices of a plurality of regions of the 3D image and indices of a plurality of regions of a packed two-dimensional (2D) image, from a server;

transmit information on a viewport of the device to the server, wherein the information on the viewport includes an index of each of a least one second region corresponding to the viewport among the plurality of regions of the packed 2D image;

in response to transmitting the information on the viewport, receive data about the at least one second region; and display the 3D image based on the received data, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and the information on the relationship between the indices of the plurality of regions of the 3D image and the indices of the plurality of regions of the packed 2D image.

5. The device of claim 4, wherein the information on the relationship between the indices of the plurality of regions of the 3D image and the indices of the plurality of regions of the packed 2D image has a form of a lookup table (LUT).

6. The device of claim 5, wherein the processor is further configured to:

identify the at least one first region among the plurality of regions of the 3D image; and identify the index of each of the at least one second region corresponding to the index of each of the at least one first region based on the LUT.

7. A method for transmitting data for a three dimensional (3D) image by a server, the method comprising:

transmitting information on a relationship between indices of a plurality of regions of the 3D image and indices of a plurality of regions of a packed two-dimensional (2D) image, to a device;

receiving information on a viewport of the device from the device, wherein the information on the viewport includes an index of each of at least one second region corresponding to the viewport among the plurality of regions of the packed 2D image; and transmitting data about the at least one second region to the device, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and the information on the relationship between the indices of the plurality of regions of the 3D image and the indices of the plurality of regions of the packed 2D image.

8. The method of claim 7, wherein the information on the relationship between the indices of the plurality of regions of the 3D image and the indices of the plurality of regions of the packed 2D image has a form of a lookup table (LUT).

9. A server for transmitting data for a three-dimensional (3D) image, comprising:

a communication interface; and a processor coupled to the communication interface, wherein the processor is configured to:

transmit information on a relationship between indices of a plurality of regions of the 3D image and indices of a plurality of regions of a packed two-dimensional (2D) image, to a device;

receive information on a viewport of the device from the device, wherein the information on the viewport includes an index of each of at least one second region corresponding to the viewport among the plurality of regions of the packed 2D image; and transmit data about the at least one second region to the device, wherein the packed 2D image is generated by modifying or rearranging at least a part of a plurality of regions of a 2D image projected from the 3D image, and wherein the at least one second region is identified based on an index of each of at least one first region corresponding to the viewport among the plurality of regions of the 3D image and the information on the relationship between indices of the plurality of regions of the 3D image and indices of the plurality of regions of the packed 2D image.

10. The server of claim 9, wherein the information on the relationship between the indices of the plurality of regions of the 3D image and the indices of the plurality of regions of the packed 2D image has a form of a lookup table (LUT).

* * * * *